US005398544A

United States Patent [19]

Lipinski et al.

[11] Patent Number: 5,398,544

[45] Date of Patent: Mar. 21, 1995

[54] METHOD AND SYSTEM FOR DETERMINING CYLINDER AIR CHARGE FOR VARIABLE DISPLACEMENT INTERNAL COMBUSTION ENGINE

[75] Inventors: Daniel J. Lipinski, Livonia; Jerry D. Robichaux, Southgate, both of Mich.

[73] Assignee: Ford Motor Company, Dearborn, Mich.

[21] Appl. No.: 172,347

[22] Filed: Dec. 23, 1993

[51] Int. Cl.$^6$ .............................................. G01M 19/00

[52] U.S. Cl. .................................. 73/118.2; 123/481; 123/198 F

[58] Field of Search ............... 73/118.2, 861; 364/510, 364/431.04

[56] References Cited

U.S. PATENT DOCUMENTS

| | | | |
|---|---|---|---|
| 4,040,395 | 8/1977 | Demetrescu | 123/481 |
| 4,144,864 | 3/1979 | Kato et al. | 123/198 F |
| 4,188,933 | 2/1980 | Iizuka | 123/198 F |
| 4,224,920 | 9/1980 | Sugasawa et al. | 123/198 F |
| 4,354,471 | 10/1982 | Sugasawa et al. | 123/481 |
| 4,463,601 | 8/1984 | Rask | 73/118.2 |
| 4,484,551 | 11/1984 | Choma et al. | 123/336 |
| 4,494,502 | 1/1985 | Endo et al. | 123/198 F |
| 4,509,488 | 4/1985 | Forster et al. | 123/481 |
| 4,541,387 | 9/1985 | Morikawa | 123/481 |
| 4,550,704 | 11/1985 | Barho et al. | 123/481 |
| 4,552,114 | 11/1985 | Sano et al. | 123/481 |
| 4,556,026 | 12/1985 | Masuda et al. | 123/198 F |
| 4,655,187 | 4/1987 | Gravestock | 123/481 |
| 4,708,108 | 11/1987 | Sakamoto et al. | 123/339 |
| 4,722,411 | 2/1988 | Ohashi et al. | 180/197 |
| 4,761,994 | 8/1988 | Sogawa | 73/118.2 |
| 4,870,934 | 10/1989 | Vanetta et al. | 123/336 |
| 4,951,209 | 8/1990 | Nagaishi et al. | 364/431.04 |
| 4,962,740 | 10/1990 | Fujimoto et al. | 123/481 |
| 4,976,228 | 12/1990 | Kawamura | 123/90.11 |
| 4,984,456 | 1/1991 | Takahashi | 73/118.2 |
| 5,003,950 | 2/1991 | Kato et al. | 73/118.2 |
| 5,008,824 | 4/1991 | Clark et al. | 73/118.2 |
| 5,029,569 | 7/1991 | Cullen et al. | 123/494 |
| 5,035,220 | 7/1991 | Uchinami et al. | 123/436 |
| 5,042,444 | 8/1991 | Hayes et al. | 123/339 |
| 5,099,816 | 4/1992 | Ohga | 123/481 |
| 5,113,823 | 5/1992 | Iriyama | 123/399 |
| 5,119,781 | 6/1992 | Trombley et al. | 123/325 |
| 5,124,922 | 6/1992 | Akiyama | 364/426.02 |
| 5,190,013 | 3/1993 | Dozier | 123/481 |
| 5,213,081 | 5/1993 | Fujimoto | 123/419 |
| 5,228,336 | 7/1993 | Nagaishi | 73/118.2 |
| 5,270,935 | 12/1993 | Dudek et al. | 73/118.2 |

FOREIGN PATENT DOCUMENTS 404041944A 2/1992 Japan .

OTHER PUBLICATIONS

"4,6,8 . . . Which Cylinder Shall We Operate?", *Motor*, Jun. 25, 1983, pp. 52–53.

D. Stojek and D. Bottomley, "The Ford 3×6 Engine", Proceedings IMech vol. 198D, No. 15, 1984.

G. Berta, M. Troilo, "Cylinder Shut-off and Pressure Charging for Lower Fuel Consumption", SAE 82072.

(List continued on next page.)

*Primary Examiner*—Richard E. Chilcot, Jr.
*Assistant Examiner*—James M. Olsen
*Attorney, Agent, or Firm*—Jerome R. Drouillard; Roger L. May

[57] ABSTRACT

A system for predicting cylinder air charge for a variable displacement internal combustion engine operating in a transition from a first number of activated cylinders to a second number of activated cylinders includes a throttle sensing system for determining the effective flow area of the air intake passage of the engine and for generating a signal corresponding to the area, an engine speed sensor for determining the speed of the engine and for generating a signal corresponding to the speed, an airflow sensor for determining the instantaneous mass airflow into the engine and for generating a signal corresponding to the airflow, and a controller for receiving the speed, flow area, and mass airflow signals and for calculating the mass of air admitted to each engine cylinder during its intake stroke, based upon the values of the signals.

13 Claims, 1 Drawing Sheet

OTHER PUBLICATIONS

K. Schellman and W. Schmid, "Possibilities by Saving Fuel by Switching Off Cylinders", Fuel Economy Research Conference, Unknown data & location.

T. Fukui, T. Nakagami, H. Endo, T. Katsumoto and Y. Danno, "Mitsubishi Orion–MD, A New Variable Displacement Engine," SAE 831007.

B. Bates, J. Dosdall and D. Smith, "Variable Displacement by Engine Valve Control", SAE Paper 780145, 1978.

"Mitsubishi has variable 2 or 4–cyclinder engine", Wards Engine and Vehicle Technology Update, Sep. 1, 1992.

"Mitsubishi unveils new fuel savings engine", recent article in Automotive News, Aug.–Sep. 1992.

METHOD AND SYSTEM FOR DETERMINING CYLINDER AIR CHARGE FOR VARIABLE DISPLACEMENT INTERNAL COMBUSTION ENGINE

BACKGROUND OF THE INVENTION

This invention relates to a system for determining the air charge within the cylinders of a multi-cylinder variable displacement internal combustion engine so as to manage the air/fuel control needs of the engine.

DESCRIPTION OF THE PRIOR ART

Automotive vehicle designers and manufacturers have realized for years that it is possible to obtain increased fuel efficiency if an engine can be operated on less than the full complement of cylinders during certain running conditions. Accordingly, at low speed, low load operation, it is possible to save fuel if the engine can be run on four instead of eight cylinders or three, instead of six cylinders. In fact, one manufacturer offered a 4–6–8 variable displacement engine several years ago, and Ford Motor Company designed a 6-cylinder engine capable of operation on only three cylinders which, although never released for production, was developed to a highly refined state. Unfortunately, both of the aforementioned engines suffered from deficiencies associated with their control strategies. Specifically, customer acceptance of the engine system actually in production was unsatisfactory because the powertrain tended to "hunt" or shift frequently between the various cylinder operating modes. In other words, the engine would shift from four to eight cylinder operation frequently, while producing noticeable torque excursions. This had the undesirable effect of causing the driver to perceive excessive changes in transmission gear in the nature of downshifting or upshifting. Another drawback to prior art systems resided in the fact that the engine emissions were not properly controlled because the air charge within the cylinders was not predicted with any accuracy. This deficiency adversely affected not only emission control, but also fuel economy.

It is an object of the present invention to provide a system for determining the cylinder air charge of a variable displacement engine, so as to allow finer control of the air/fuel ratio. The present system advantageously allows cylinder air charge to be predicted in sufficient time to permit the supply of a correct quantity of fuel.

SUMMARY OF THE INVENTION

A system for predicting cylinder air charge for a throttled, variable displacement, reciprocating internal combustion engine operating in a transition from a first number of activated cylinders to a second number of activated cylinders includes a throttle sensing system for determining the effective flow area of the air intake passage of the engine ($AREA_f$), and for generating a signal corresponding to said area, an engine speed sensor for determining the speed of the engine and for generating a signal corresponding to said speed, and an airflow sensor for determining the instantaneous mass airflow into the engine and for generating a signal corresponding to said airflow. A system according to this invention further includes a controller for receiving the speed, flow area, and mass airflow signals and for calculating the mass of air admitted to each engine cylinder during its intake stroke, based upon the values of the signals.

The controller predicts the mass of air admitted to each cylinder according to an iterative process by first determining an initial mass value based on a funtion of said airflow signal and a predicted final mass value determined as a function of the speed and flow area signals, by modifying the initial and predicted final values as functions of a time constant based upon said speed and flow area signals, so as to determine the amount by which the mass changes during any particular iteration, by correcting the the previously determined mass value by the change amount, and by continuing the iterations by substituting each newly corrected value of air mass for the initial value. The values for the final mass and the time constant are read from lookup tables contained within the controller; these values may be determined by mapping the performance of the engine.

According to another aspect of the present invention, a method for predicting cylinder air charge for a variable displacement internal combustion engine operating in a transition from a first number of activated cylinders to a second number of activated cylinders includes the steps of: determining the effective flow area of the air intake passage of the engine and generating a signal corresponding to said area, determining the instantaneous mass airflow into the engine and generating a signal corresponding to the airflow, determining the speed of the engine and generating a signal corresponding to said speed, and calculating the mass of air admitted to each engine cylinder during its intake stroke, based upon the values of the position, speed, and mass airflow signals. The mass of air admitted to each cylinder is predicted according to an iterative process by the steps of: determining an initial mass value based on a funtion of said airflow signal, by modifying the initial value as a function of a time constant based upon said speed and flow area signals, and by further modifying the initial value by a quantity determined from a predicted final air mass determined as a function of the speed and flow area signals, as modified by a function of said time constant.

According to another aspect of the present invention, a system for predicting cylinder air charge for a throttled, variable displacement, reciprocating internal combustion engine operating in a steady state condition includes an engine speed sensor for determining the speed of the engine and for generating a signal corresponding to said speed, an airflow sensor for determining the instantaneous mass airflow into the engine and for generating a signal corresponding to said airflow, and a controller for receiving the speed and mass airflow signals and for iteratively calculating the mass of air admitted to each engine cylinder during its intake stroke, based upon the values of the signals, with the controller first determining an instantaneous mass value by integrating the value of the airflow signal over a variable period based upon the number of cylinders in operation, and with the controller modifying the instantaneous mass value and a previously calculated mass value as functions of a time constant selected at least in part upon the number of cylinders in operation, and with said controller continuing the iterations by substituting each newly calculated value for air charge for the previously calculated value. The time constant is adjusted to account for the increased volumetric efficiency of said engine while operating with fewer than the maximum number of cylinders.

DETAILED DESCRIPTION OF THE PREFERRED EMBODIMENTS

Figure 1:
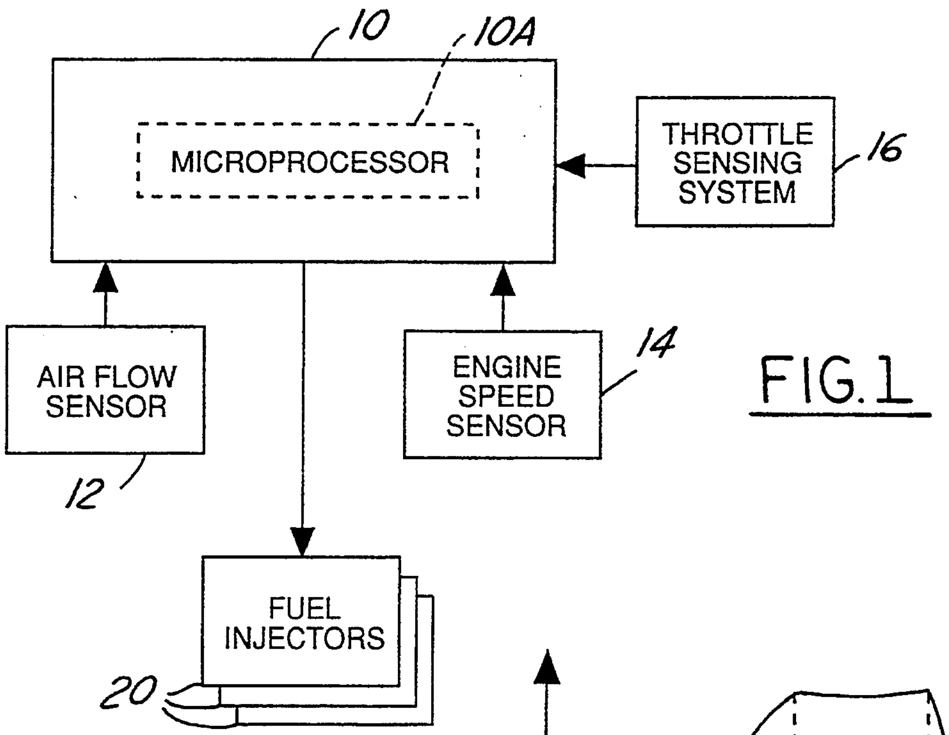
FIG. 1 is a block diagram of an air charge calculation system according to the present invention.

As shown in FIG. 1, a system for determining air charge for a a variable displacement engine includes microprocessor controller 10 of the type commonly used to provide engine control. Controller 10 contains microprocessor 10A, which may use a variety of inputs from various sensors, including, without limitation, sensors for engine coolant temperature, air charge temperature, intake manifold pressure, accelerator pedal position, and other engine and vehicle sensors known to those skilled in the art and suggested by this disclosure. Specific sensors providing information to controller 10 include airflow sensor 12, which measures the mass airflow entering the engine, and engine speed sensor 14. Throttle sensing system 16 determines the effective flow area of the passage through which air enters the engine. As used herein, the term "effective flow area" ($AREA_f$), means not only the cross sectional area at a throttle body, but also the effect on airflow caused by multiple throttle plates, such as where both manually and electronically positionable throttle plates are used. Throttle sensing system 16 will generate a signal corresponding to the effective flow area. This is accomplished either through the use of a lookup table, or through analytical functions, with each using throttle position as an independent variable.

Controller 10 has the capability of disabling selected cylinders in the engine so as to cause the engine to have a reduced effective displacement. For example, with an eight-cylinder engine, the engine may be operated on 4, 5, 6 or 7 cylinders, or even 3 cylinders, as required. Those skilled in the art will appreciate in view of this disclosure that a number of different disabling devices are available for selectively rendering the cylinders of the engine inoperative. Such devices include mechanisms for preventing any of the valves from opening in the disabled cylinders, such that burnt, or exhaust, gas remains trapped within the cylinder. Such devices may also include mechanisms for altering the effective stroke of one or more cylinders. It has been determined that the amount of air in the engine's cylinders varies greatly as the number of cylinders which are activated changes, and, as a result, control of the air fuel ratio will be significantly impaired if the air charge within the cylinders is not predicted accurately.

Figure 2:
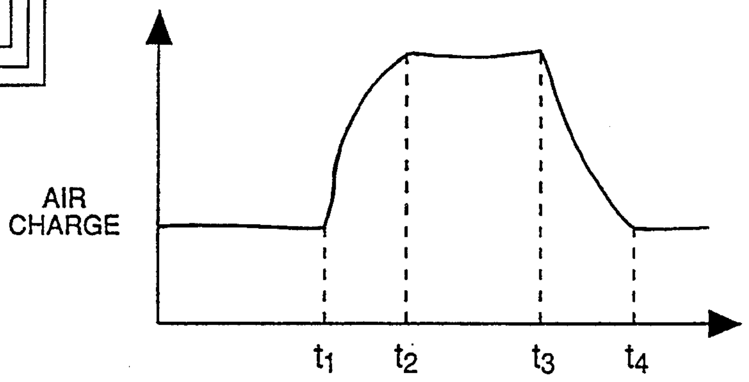
FIG. 2 illustrates calculated air charge as a function of time during two cylinder mode transitions for a variable displacement engine according to the present invention.

Turning now to FIG. 2, cylinder air charge is shown as a function of time for a variable displacement engine moving through a transition from operation with eight cylinders to operation with four cylinders during the period from time $t_1$ to time $t_2$. Prior to time $t_1$ the engine was operating with eight cylinders in a steady-state condition. During the period from $t_2$ to $t_3$, the engine is operating in four cylinders. During the period from $t_3$ to $t_4$, the engine is moving through a transition from operation with four cylinders to operation with eight cylinders. The purpose of the present system and method is to assure that controller 10 has accurate estimates of the cylinder air charge during not only the periods of operation at steady-state, such as the period extending between times $t_2$ and $t_3$, but also during transitions, such as those occurring between $t_1$ and $t_2$ and $t_3$ and $t_4$. Because the present system uses a stored value of final air charge applying after a transition, this system is able to predict air charge with a level of accuracy sufficient to enhance air/fuel control because fuel delivery can be scheduled in sufficent time to obtain the proper charge preparation during the rapidly changing conditions which characterize cylinder mode transitions. Those skilled in the art will appreciate that known air charge calculation systems use integrated values for air charge; such systems are merely reactive, whereas the present system is proactive.

Figure 3:
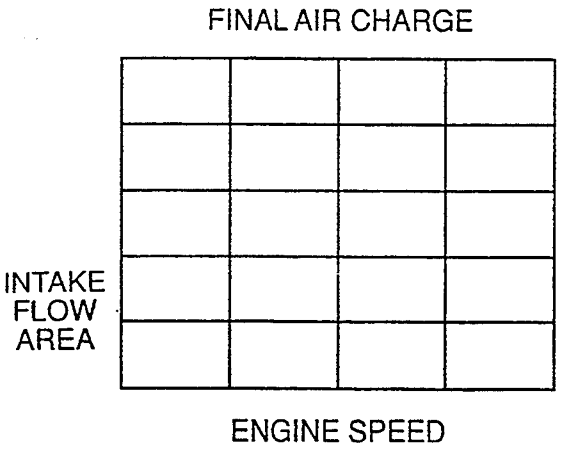
FIG. 3 illustrates a lookup table for final air charge as a function of intake flow area and engine speed.
Figure 4:
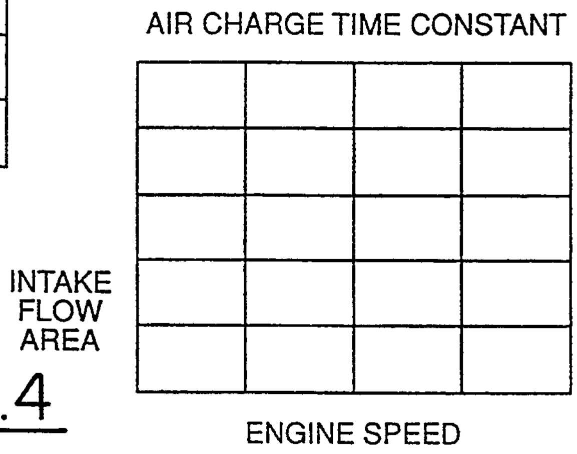
FIG. 4 illustrates a lookup table for a cylinder air charge time constant as a function of intake flow area and engine speed.

The present system handles the problem of predicting cylinder air charge by first reading values corresponding to engine speed, mass airflow, and $AREA_f$, which was previously defined as the effective engine airflow intake area. The values of engine speed and $AREA_f$ are read continuously during a transition. In the example of FIG. 2, the values for engine speed and $AREA_f$, and mass airflow are read at time $t_1$. Then, processor 10A will determine an initial cylinder air charge mass by integrating the output of airflow sensor 12 over a period of time based upon the number of cylinders in operation. If, for example, the engine is operating with eight cylinders, as at time $t_1$, processor 10A will integrate the output of airflow sensor 12 for two counts occurring over one-quarter of a crankshaft revolution. If, however, the engine is operating with four cylinders, as at time $t_3$, processor 10A will integrate the output of airflow sensor 12 over four counts occurring over one-half of a crankshaft revolution. Then processor 10A uses the lookup table illustrated in FIG. 3 to determine a final air charge value, applicable at time $t_2$. The initial and final values are used in the following equation to determine the amount by which the air charge mass changes during an iteration.

$$\dot{CAC} = -CAC(t)/\tau(AREA_f,N) + CAC(AREA_f,N)/\tau(AREA_f,N)$$

where:

- $CAC(t)$ = air charge at any particular time, t.
- $\tau(AREA_f,N)$ = an intake manifold filling time constant drawn from the lookup table FIG. 4, based on the values of $AREA_f$ and engine speed at time $t_1$, initially; $\tau(AREA_f,N)$ is determined subsequently at each time interval during the iterative process.
- $CAC(AREA_f,N)$ = final cylinder air charge predicted at time $t_2$, which is drawn from the table in FIG. 3, based on the values of $AREA_f$ and engine speed at time $t_1$ initially; $CAC(AREA_f,N)$ is determined subsequently at each time interval during the iterative process.

After determining the time rate of change of cylinder air charge with the equation shown above, the previously determined iterative mass value is corrected by the change amount using the following equation:

$$CAC(t+\delta t) = CAC(t) + (\dot{CAC})(\delta t).$$

Having determined the air charge for a plurality of time periods intervening between time $t_1$ and time $t_2$, controller 10 is able to direct injectors 20 to deliver a desired amount of fuel on a timely basis because the predictive iteration process allows the calculation of cylinder air charge to lead the actual engine events.

During the time from $t_3$ to $t_4$, the iterative process described above is rerun by processor 10A, beginning with the calculation of a new air charge value at time $t_3$, based upon the integration of the output of airflow sensor 12. Then, new values for $CAC(AREA_f,N)$ and $\tau(AREA_f,N)$ are selected from the lookup tables and the iteration continues as before.

During the time from $t_2$ to $t_3$, as well as during the time before $t_1$ and after $t_4$, the engine is not in a transition marked by a change in the number of operating cylinders, and processor 10A determines cylinder air charge by the following equation, which is used in an iterative process, as previously described for the transient air charge calculation:

$$CAC=(1-AIR_FK)(CAC(k-1))+(AIR_{FK})\cdot(CAC(inst))$$

where:

AIR_FK=a manifold filling time constant.

CAC(inst)=air charge calculated by integrating the output of airflow sensor 12.

CAC(k−1)=the air charge calculated during the immediately preceding iteration.

AIR_FK, which varies with volumetric efficiency, is also corrected for the number of cylinders in operation. It has been determined that the value of AIR_FK should be halved, for example, when the number of operating cylinders transitions from eight to four. It has further been determined that during fractional operation with less than the maximum number of cylinders, the value of AIR_FK should be increased to account for increased volumetric efficiency. This may be accomplished by multiplying the eight cylinder value of AIR_FK by the ratio of the expected eight and four cylinder air charges at the same air inlet density, as determined by lookup tables as functions of intake manifold pressure and engine speed, for both four and eight cylinder operation. In essence, AIR_FK is first determined for operation with the maximum number of cylinders and then adjusted for the number of cylinders actually in operation, as well as for the volumetric efficiency associated with the number of cylinders actually in operation.

Changes and modifications may be made to the system described herein without departing from the scope of the invention as set forth in the appended claims. And, a system according to the present invention has wide applicability and could be employed to operate an eight cylinder engine at three, four, five, six, seven, or eight cylinders, or a six cylinder engine at three, four, five or six cylinders.

We claim:

1. A system for predicting cylinder air charge for a throttled, variable displacement, reciprocating internal combustion engine operating in a transition from a first number of activated cylinders to a second number of activated cylinders, comprising:

a throttle sensing system for determining the effective flow area of the air intake passage of the engine and for generating a signal corresponding to said area;

an engine speed sensor for determining the speed of the engine and for generating a signal corresponding to said speed;

an airflow sensor for determining the instantaneous mass airflow into the engine and for generating a signal corresponding to said airflow; and a controller for receiving said speed, flow area, and mass airflow signals and for calculating the mass of air admitted to each engine cylinder during its intake stroke, based upon the values of said signals.

2. A system according to claim 1, wherein said controller predicts the mass of air admitted to each cylinder according to an iterative process by first determining an initial mass value based on a funtion of said airflow signal and a predicted final mass value determined as a function of the speed and flow area signals, by modifying the initial and predicted final values as functions of a time constant based upon said speed and flow area signals, so as to determine the amount by which the mass changes during any particular iteration, by correcting the the previously determined mass value by the change amount, and by continuing the iterations by substituting each newly corrected value of air mass for the initial value.

3. A system according to claim 2, wherein the values of said predicted final mass and said time constant are read from lookup tables contained within said controller.

4. A system according to claim 3, wherein the values contained in said lookup tables are determined by mapping the performance of said engine.

5. A system according to claim 2, wherein said initial mass value and said final mass value are used in the following equation to determine the amount by which the air charge mass changes during an iteration:

$$\dot{CAC}=-CAC(t)/\tau(AREA_f,N)+CAC(AREA_f,N)/\tau(AREA_f,N)$$

where:

CAC(t)=air charge at any particular time, t;

$\tau(AREA_f,N)$=an intake manifold filling time constant;

$CAC(AREA_f,N)$=predicted final cylinder air charge.

6. A method for predicting cylinder air charge for a variable displacement internal combustion engine operating in a transition from a first number of activated cylinders to a second number of activated cylinders, comprising the steps of:

determining the effective flow area of the air intake passage of the engine and generating a signal corresponding to said area;

measuring the instantaneous mass airflow into the engine and generating a signal corresponding to the airflow;

determining the speed of the engine and generating a signal corresponding to said speed; and calculating the mass of air admitted to each engine cylinder during its intake stroke, based upon the values of the flow area, speed, and mass airflow signals.

7. A method according to claim 6, wherein said mass of air admitted to each cylinder is predicted according to an iterative process by the steps of:

determining an initial mass value based on a funtion of said airflow signal;

by modififying the initial value as a function of a time constant based upon said speed and flow area signals; and by further modifying the initial value by a quantity determined from a predicted final air mass determined as a function of the speed and flow area signals, as modified by a function of said time constant.

8. A method according to claim 6, wherein the values of said final air mass and said time constant are read from lookup tables.

9. A method according to claim 8, wherein the values contained in said lookup tables are determined by mapping the performance of said engine.

10. A system for predicting cylinder air charge for a throttled, variable displacement, reciprocating internal combustion engine operating in a steady state condition, comprising:

an engine speed sensor for determining the speed of the engine and for generating a signal corresponding to said speed;

an airflow sensor for determining the instantaneous mass airflow into the engine and for generating a signal corresponding to said airflow; and a controller for receiving said speed and said mass airflow signals and for iteratively calculating the mass of air admitted to each engine cylinder during its intake stroke, based upon the values of said signals, with said controller first determining an instantaneous mass value by integrating the value of said airflow signal over a period based upon the number of cylinders in operation, and with said controller modififying the instantaneous mass value and a previously calculated mass value as functions of a time constant selected at least in part upon the number of cylinders in operation, with said controller continuing the iterations by substituting each newly calculated value for air charge for the previously calculated value.

11. A system according to claim 10, wherein said time constant is adjusted to account for the increased volumetric efficiency of said engine while operating with fewer than the maximum number of cylinders.

12. A system according to claim 10, wherein said instantaneous mass value and said time constant are used in the following equation to determine the air charge mass within an engine cylinder:

$$CAC=(1-\mathrm{AIR\_FK})(CAC(k-1))+(\mathrm{AIR\_FK})(CAC(inst))$$

where:

AIR_FK=a manifold filling time constant.

CAC(inst)=air charge calculated by integrating the output of airflow sensor 12.

13. A system according to claim 12, wherein AIR_FK is first determined for operation with the maximum number of cylinders and then adjusted for the number of cylinders actually in operation, as well as for the volumetric efficiency associated with the number of cylinders actually in operation.

* * * * *